Sept. 2, 1952     J. L. CAHILL     2,608,984
AUTOMATIC SHUTOFF FUEL VALVE
Filed July 23, 1947     2 SHEETS—SHEET 1
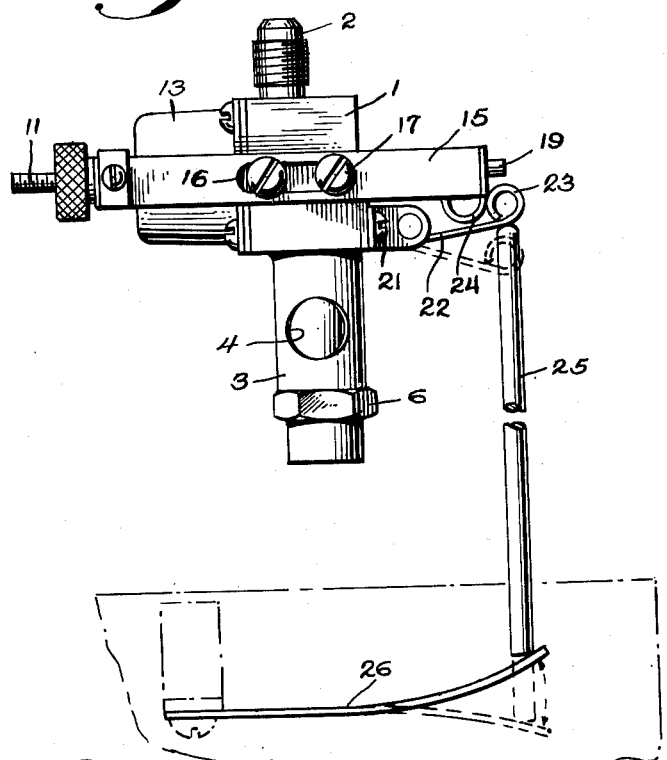
Fig. 1
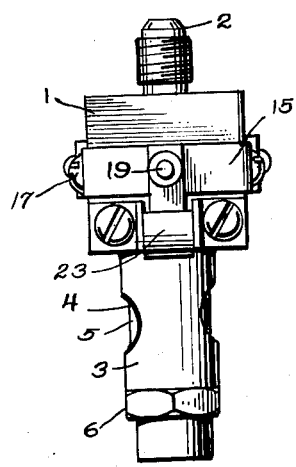
Fig. 2
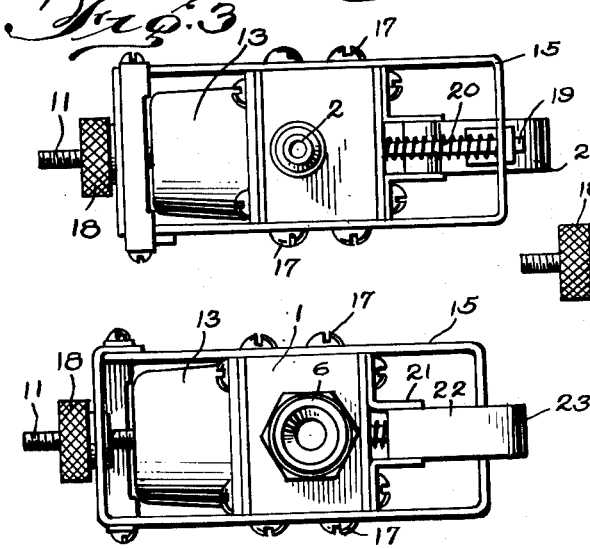
Fig. 3
Fig. 4
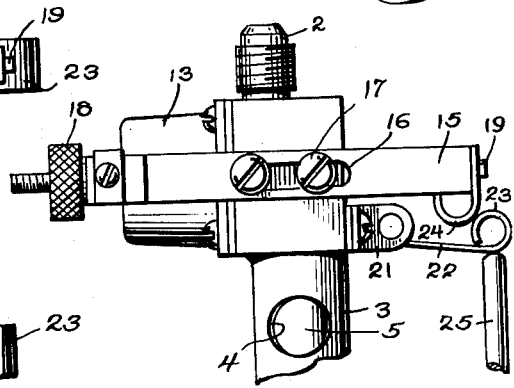
Fig. 5
INVENTOR.
John L. Cahill
BY
W. J. Eccleston,
ATTORNEY Sept. 2, 1952 J. L. CAHILL 2,608,984
AUTOMATIC SHUTOFF FUEL VALVE
Filed July 23, 1947 2 SHEETS—SHEET 2

INVENTOR.
John L. Cahill
BY
W. J. Eccleston,
ATTORNEY

Patented Sept. 2, 1952

2,608,984

UNITED STATES PATENT OFFICE 2,608,984

AUTOMATIC SHUTOFF FUEL VALVE

John L. Cahill, Dayton, Ohio

Application July 23, 1947, Serial No. 763,128

4 Claims. (Cl. 137—65)

(Granted under the act of March 3, 1883, as amended April 30, 1928; 370 O. G. 757)

The invention described herein may be manufactured and used by or for the Government for governmental purposes, without the payment to me of any royalty thereon.

The invention relates to shut-off valves and has for its primary object to provide a mechanism for automatically shutting off the flow of fuel to a burner in the event that the flame should be extinguished.

A further object of the invention resides in the provision of a shut-off mechanism of relatively few parts and yet which is highly reliable in not only shutting the valve but also in maintaining it closed until such time as it may be manually reopened.

Other objects and advantages of the invention will be apparent from the following description when taken in connection with the accompanying drawings in which, Figure 1 is a side elevational vew of the shut-off valve the same being shown in open position in full lines and the latch being shown in inoperative position in dotted lines;

Figure 2 is a rear elevational view of the valve;

Figure 3 is a top plan view;

Figure 4 is a bottom plan view of the valve;

Figure 5 is a side elevational view showing the valve in closed position and the latch midway between its open and closed positions.

Figure 6:
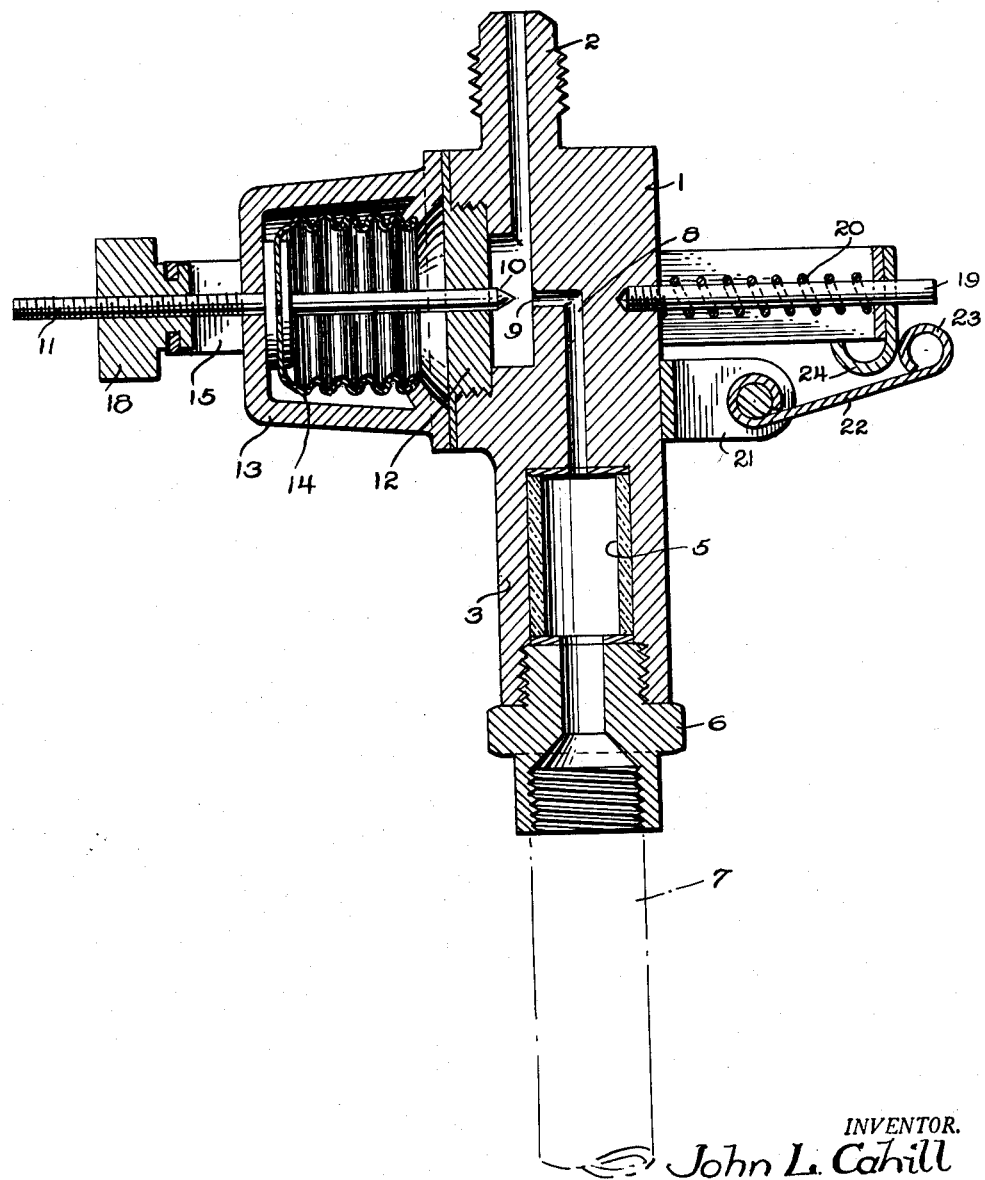
Figure 6 is an enlarged vertical sectional view of the valve and related parts.

More specifically, the numeral 1 indicates a valve casing provided with an inlet nipple 2 at its upper end adapted to be connected to a gasoline inlet line. The lower end of the casing is provided with an outlet extension 3 having an observation opening 4 and a glass insert 5 through which the feeding of the gasoline may be inspected. Attached to the lower end of the extension 3 is a nipple 6 to which is attached a pipe 7 leading to a burner.

The passageway 8 within the valve body is provided with a valve seat 9 adapted to cooperate with a valve 10 formed on the inner end of the valve stem 11; the latter extending through and being guided by a disc 12 which is threaded into the side of the valve casing. Mounted on the exterior of the valve casing and overlapping the valve guide 12 is a housing 13 for a bellows 14 which serves as a seal for the valve stem 11.

Encircling the valve casing and slidably mounted thereon is a rectangular cage 15, the latter being provided with elongated slots 16 in its side walls through which extend screws 17 for securing the cage in position and permitting a sliding movement. One end of the cage, namely, that shown at the left of Figures 1, 3, 4, 5 and 6 is provided with an adjusting screw 18 which is swiveled to the cage and is provided with internal threads for cooperation with the threads on the valve stem 11. A rod 19 is secured to the opposite side of the casing and has its free end extending through the adjacent end of the cage 15. This rod serves as a guide and support for the cage and has a mounting for a compression spring 20 which biases the cage to the right as shown in the various figures mentioned above and thereby tends to move the valve 10 against its seat 9. Fixed to the casing 1 just below the cage 15 is a bracket 21 to which is pivotally connected a latch 22 provided with a rounded end 23 for cooperation with a rounded lug or cam 24 secured to the adjacent end of the cage.

The latch 22 is mounted on a horizontal pivot and is normally moved to its lower or unlocked position by means of gravity. This latch, however, may be held in its closed position by the finger of an operator applied to the underside of the free end of the latch, and also by means of a rod 25 which is mounted for vertical reciprocation in alignment with the free end of the latch and directly above a bi-metal thermostat 26 which is mounted adjacent the burner which is fed by the valve disclosed herein.

In the operation of the device the cage 15 is moved to the left so as to open the valve 10 and the latch 22—23 is raised so that its operative end engages the rounded lug 24, and the burner may then be lighted. As soon as the thermostat 26 becomes heated sufficiently to bend upwardly and support the rod 25 and latch 23 in closed position, that is, the position shown in full lines Figure 1, the finger of the operator may be removed and the feed valve will remain open. If, however, the flame should become extinguished the cooling of the thermostat will allow the rod 25 to descend to its lower position and the latch 22—23 will also descend to its lower position due to the action of gravity supplemented by a camming action provided by the pressure of the rounded lug 24 against the rounded end 23 of the latch. It is obvious that the feeding of gasoline is then automatically shut off and cannot be resumed until the cage 15 is again moved to the left against the pressure of spring 20 and either held in that position by the finger of the operator or by the latch 23 when supported by the thermostat 26 after the burner is set in operation. The rate of flow of the gasoline may of course be varied by adjustment of the screw 18 so as to adjust the extent of opening of the valve 10.

From the foregoing description and the attached drawings it will be apparent to those skilled in the art that I have devised an automatic shut-off valve composed of relatively few parts and yet one which is thoroughly reliable in operation in that the latch which holds the valve open is automatically operated by gravity as soon as the thermostat is rendered inoperative and this action is supplemented by the camming action of the elements 23—24 and the spring 20, and that the valve cannot be thereafter reopened until the valve operating cage 15 is manually moved to open position by the operator.

In accordance with the patent statutes I have described what I now consider the preferred embodiment of the invention but inasmuch as many changes may be made in the structural details without departing from the spirit of the invention it is intended that all such changes be included within the scope of the appended claims.

I claim:

1. In a valve for a fluid fuel burner having a fuel supply line, a valve casing and valve for controlling the flow of fuel through the line, a valve operator comprising a cage having portions slidably connected to said casing, a valve stem connecting the valve to one portion of the cage, a spring cooperating with the cage to bias the valve to closed position, a gravity operated latch cooperating with the cage to releasably hold the valve in open position, a thermostat for maintaining the latch in its operative position under certain conditions, and a cam on the cage for supplementing gravity in moving the latch to inoperative position.

2. In a valve for a fluid fuel burner having a fuel supply line, a valve casing and valve for controlling the flow of fuel through the line, a valve operator comprising a substantially rectangular cage having its sides slidably connected to said casing, a valve stem connecting the valve to one end of the cage, a spring for biasing the cage in one direction to move the valve to closed position, a gravity-operated latch releasably holding the cage and valve in open position, a thermostat for maintaining the latch in its operative position under certain conditions, and a cam on the cage for supplementing gravity in moving the latch to the inoperative position.

3. In a valve for a fluid fuel burner having a fuel supply line, a valve casing and valve for controlling the flow of fuel through the line, a valve operator comprising a substantially rectangular cage, a slidable connection between the side walls of the cage and the valve casing, a valve stem connecting the valve to one end of the cage, a rod fixed to the casing and extending through an opening in the opposite end of the cage, a coil spring on said rod having one end in engagement with the casing and the other end in engagement with the adjacent end of the cage for biasing the valve to closed position, a gravity-operated latch for engaging the cage so as to releasably hold the valve in open position, a thermostat for holding the latch in engagement with the cage under certain conditions, and a cam on the cage for supplementing gravity in moving the latch to inoperative position.

4. In a valve for a fluid fuel burner having a fuel supply line, a valve casing and valve for controlling the flow of fuel through the line, a valve operator comprising a substantially rectangular cage, a slidable connection between the side walls of the cage and the valve casing, a valve stem connecting the valve to one end of the cage, a rod fixed to the casing and extending through an opening in the opposite end of the cage, a coil spring on said rod having one end in engagement with the casing and the other end in engagement with the adjacent end of the cage for biasing the valve to closed position, a latch for engaging the cage so as to releasably hold the valve in open position, and a cam means on the cage adjacent the latch for moving the same to inoperative position when latch is released by the thermostat.

JOHN L. CAHILL.

REFERENCES CITED

The following references are of record in the file of this patent:

UNITED STATES PATENTS

| Number | Name | Date |
| --- | --- | --- |
| 732,124 | Seymour | June 30, 1903 |
| 738,037 | Hentz | Sept. 1, 1903 |
| 898,295 | Wilson | Sept. 8, 1908 |
| 1,500,772 | Schwartz | July 8, 1924 |
| 1,593,764 | Hill | July 27, 1926 |
| 1,607,343 | Davenport | Nov. 16, 1926 |
| 1,632,144 | Nemec | June 14, 1927 |
| 1,635,986 | Erbe | July 19, 1927 |
| 1,807,310 | Ellman | May 26, 1931 |
| 1,828,883 | Tuck | Oct. 27, 1931 |
| 1,977,150 | Schmidt | Oct. 16, 1934 |
| 2,120,763 | Moore | June 14, 1938 |

FOREIGN PATENTS

| Number | Country | Date |
| --- | --- | --- |
| 612,388 | Germany | Apr. 23, 1935 |